United States Patent
Son

(10) Patent No.: US 11,052,343 B2
(45) Date of Patent: Jul. 6, 2021

(54) DROPLET GENERATING DEVICE AND DROPLET GENERATING METHOD

(71) Applicant: Sang Young Son, Gyeonggi-do (KR)

(72) Inventor: Sang Young Son, Gyeonggi-do (KR)

( * ) Notice: Subject to any disclaimer, the term of this patent is extended or adjusted under 35 U.S.C. 154(b) by 241 days.

(21) Appl. No.: 16/068,745

(22) PCT Filed: Jan. 4, 2017

(86) PCT No.: PCT/KR2017/000087
§ 371 (c)(1),
(2) Date: Jul. 9, 2018

(87) PCT Pub. No.: WO2017/122962
PCT Pub. Date: Jul. 20, 2017

(65) Prior Publication Data
US 2019/0015771 A1    Jan. 17, 2019

(30) Foreign Application Priority Data
Jan. 11, 2016 (KR) .......... 10-2016-0003046

(51) Int. Cl.
*B01D 47/05* (2006.01)
*B01D 53/76* (2006.01)
(Continued)

(52) U.S. Cl.
CPC .......... *B01D 47/05* (2013.01); *B01D 53/002* (2013.01); *B01D 53/76* (2013.01); *B01D 53/77* (2013.01); *B01D 53/78* (2013.01); *B01D 5/006* (2013.01); *B01D 5/0027* (2013.01); *B01D 53/0407* (2013.01); *B01D 2257/70* (2013.01); *B01D 2257/91* (2013.01)

(58) Field of Classification Search
CPC .............................. B01D 47/05; B01D 53/002
See application file for complete search history.

(56) References Cited

U.S. PATENT DOCUMENTS 7,135,058 B1 * 11/2006 Burkay .................. B01D 47/04
                                                                95/150
8,449,657 B2    5/2013 Son et al.
(Continued)

FOREIGN PATENT DOCUMENTS

JP    60-000097 B2    1/1985
JP    60-004722 B2    2/1985
(Continued)

OTHER PUBLICATIONS

English machine translation of WO 2014/101296, obtained from WIPO IP Portal (Year: 2014).*
(Continued)

*Primary Examiner* — Renee Robinson
(74) *Attorney, Agent, or Firm* — Patterson Thuente Pedersen, P.A.

(57) ABSTRACT

A droplet generating device includes a tube defining a area in which air including particles flows along a first direction and an evaporation and condensation unit disposed in the tube to intersect with the first direction, the evaporation and condensation unit supplying vapor in the area to supersaturate the area to condense the vapor on surfaces of the particles to form a droplet. Accordingly, droplets may be effectively generated.

13 Claims, 4 Drawing Sheets

(51) Int. Cl.
  *B01D 53/77* (2006.01)
  *B01D 53/78* (2006.01)
  *B01D 53/00* (2006.01)
  *B01D 5/00* (2006.01)
  *B01D 53/04* (2006.01)

(56) References Cited

U.S. PATENT DOCUMENTS

| | | | | |
|---|---|---|---|---|
| 2006/0158640 A1* | 7/2006 | Molter | ............... | G01N 15/065 356/37 |
| 2008/0083274 A1* | 4/2008 | Hering | ............... | G01N 15/065 73/170.19 |
| 2014/0360363 A1* | 12/2014 | Kusuura | ............. | B01D 49/006 95/29 |

FOREIGN PATENT DOCUMENTS

| | | | | |
|---|---|---|---|---|
| KR | 10-0963537 B1 | | 6/2010 | |
| KR | 10-2011-0042295 A | | 4/2011 | |
| KR | 10-2015-0049247 | | 2/2016 | |
| WO | WO 99/56854 | * | 11/1999 | ............. B01D 51/00 |
| WO | WO 2009/136166 | | 11/2009 | |
| WO | WO 2014/202296 | * | 7/2014 | ............. B01D 53/00 |

OTHER PUBLICATIONS

Office Action from Chinese Application No. 201780006158.1, dated Dec. 18, 2019, with English translation, 13 pgs.

PCT International Search Report for PCT/KR2017/000087, dated Apr. 19, 2017, 4 pages.
PCT Written Opinion of the ISA for PCT/KR2017/000087, dated Apr. 19, 2017, 9 pages.
English translation of PCT International Search Report for PCT/KR2017/000087, dated Apr. 19, 2017, 3 pages.
Office Action for KR 10-2016-0003046, dated May 18, 2016, 6 pages.
English translation of Office Action for KR 10-2016-0003046, dated May 18, 2016, 5 pages.
Office Action for KR 10-2016-0003046, dated Oct. 27, 2016, 4 pages.
English translation of Office Action for KR 10-2016-0003046, dated Oct. 27, 2016, 3 pages.
Office Action for KR 10-2016-0103667, dated Apr. 17, 2017, 8 pages.
English translation of Office Action for KR 10-2016-0103667, dated Apr. 17, 2017, 7 pages.
Office Action for KR 10-2016-0103667, dated Oct. 30, 2017, 6 pages.
English translation of Office Action for KR 10-2016-0103667, dated Oct. 30, 2017, 6 pages.
English translation of the Decision on Registration for KR 10-2016-0003046, dated Jan. 23, 2017, 1 page.
English translation of the Decision on Registration for KR 10-2016-0103667, dated Jun. 14, 2018, 1 page.

* cited by examiner

FIG. 7

```
START
  ↓
Supplying air
containing particles in a tube    —S110
  ↓
Condensing vapor on surfaces of
particles to form a droplet       —S120
  ↓
END
```

DROPLET GENERATING DEVICE AND DROPLET GENERATING METHOD

CROSS-REFERENCE TO RELATED APPLICATIONS

This application is a National Phase entry of PCT Application No. PCT/KR2017/000087 filed Jan. 4, 2017, which application claims the benefit of priority to KR Application No. 10-2016-0003046, filed Jan. 11, 2016, the entire disclosures of which are incorporated herein by reference.

BACKGROUND OF THE INVENTION

1. Field of the Invention

Example embodiments of the present invention relate to a droplet generating device and a droplet generating method. More particularly, example embodiments of the present invention relate to a droplet generating device and a droplet generating method for supplying air containing particles and condensing vapor on surfaces of the particles to generate a droplet.

2. Description of the Related Art

As a modern industry has developed, particles have been generated from factories or automobiles as air pollutants. As a problem of air pollution becomes serious, there have been active researches on the technology for removing pollutants from the air.

A filter has been generally used to remove the contaminant particles from the air. However, in the case of a filter, the removal efficiency varies depending on the sizes of the particles, which might cause the filter to be limitedly used. Furthermore, there is a problem that the efficiency of the filter deteriorates as the filter has been used for a long time.

Accordingly, there is a need for a droplet generating device and a droplet generating method capable of generating droplets by supplying vapor to the surfaces of particles having a relatively small size and condensing the vapor on the surfaces of the particles.

U.S. Pat. No. 8,449,657, of which the present inventor filed to the United States Patent and Trademark Office, discloses that air containing particles flows along a direction of extension of a tube, and vapor is provided into the tube using diffusion phenomena and a pressure difference.

In this case, a relative humidity in the tube along a second direction perpendicular to the extension direction may have a non-uniform degree of supersaturation gradient. Therefore, a problem that sizes of the droplets agglomerated along the second direction are not uniform may occur.

In addition, there is a difficulty in uniformly condensing the vapor in the particles contained in the air, as the air in the tube has a non-uniform temperature gradient along the second direction perpendicular to the extending direction.

SUMMARY OF THE INVENTION

Example embodiments of the present invention provide a droplet generating device capable of efficiently generating droplets by supplying vapor to air containing particles to condense the vapor on the surfaces of the particles.

Example embodiments of the present invention provide a droplet generating method capable of efficiently generating droplets by supplying vapor to air containing particles to condense the vapor on the surfaces of the particles.

According to one aspect of the present invention, there is provided a droplet generating device including a tube defining a area in which air including particles flows along a first direction and an evaporation and condensation unit disposed in the tube to intersect with the first direction, the evaporation and condensation unit supplying vapor in the area to supersaturate the area to condense the vapor on surfaces of the particles to form a droplet.

In an example embodiment of the present invention, the evaporation and condensation unit may be arranged to be inclined at 5 to 90 degrees with respect to the first direction.

In an example embodiment of the present invention, the evaporation and condensation unit may be arranged entirely over a vertical section of the area perpendicular to the first direction.

In an example embodiment of the present invention, the evaporation and condensation unit may have at least one mesh structure including a plurality of wires randomly arranged such that the mesh structure may include a through hole formed between the wires.

Here, each of the wires includes may include a liquid-absorbing layer including a hydrophilic material capable of holding the liquid as a source of the vapor, and a heating element for heating liquid formed on surfaces thereof.

In an example embodiment of the present invention, each of the wires may include a concave-convex pattern or a hydrophilic surface coating layer for holding liquid using a capillary force.

In the meantime, the heating element may evaporate the vapor from the surface of the wires In an example embodiment of the present invention, a plurality of mesh structures is spaced apart from each other.

In an example embodiment of the present invention, a supersaturation degree is uniformly formed as a whole along a second direction perpendicular to the first direction at a specific point along the first direction.

In an example embodiment of the present invention, a temperature distribution is uniformly formed as a whole along a second direction perpendicular to the first direction at a specific point along the first direction.

According to one aspect of the present invention, there is provided a droplet generating device. The droplet generating method includes providing air including particles in a tube defining a area along a first direction and providing vapor in the area and maintaining a uniform supersaturation degree as a whole along a second direction perpendicular to the first direction to condense the vapor on surface of the particles.

In an example embodiment of the present invention, maintaining the uniform supersaturation degree is performed using a evaporation and condensation unit arranged in the tube to intersect with the first direction.

In an example embodiment of the present invention, maintaining the uniform supersaturation degree includes forming a temperature distribution uniformly as a whole along a second direction perpendicular to the first direction at a specific point along the first direction.

According to example embodiments of the present invention, the droplet generating device includes the evaporation and condensation unit arranged to intersect with the direction of air flow in a tube, capable of condensing the vapor on the surface of the particle by supplying the vapor in the area and forming the area in the supersaturated state. Therefore, the supersaturated state in the area can be maintained uniformly. As a result, the vapor can be effectively condensed on the surfaces of the particles contained in the air flowing in the area to form droplets effectively.

Further, the air containing the particles can reach to the evaporation and condensation unit uniformly such vapor can effectively make contact with the particles to effectively condense the vapor on the surfaces of the particles.

BRIEF DESCRIPTION OF THE DRAWINGS

The above and other features and advantages of the present invention will become more apparent by describing in detailed example embodiments thereof with reference to the accompanying drawings, in which:

FIG. 7 is a flow chart illustrating a droplet generating method in accordance with an example embodiment of the present invention.

DESCRIPTION OF THE EMBODIMENTS

Figure 1:
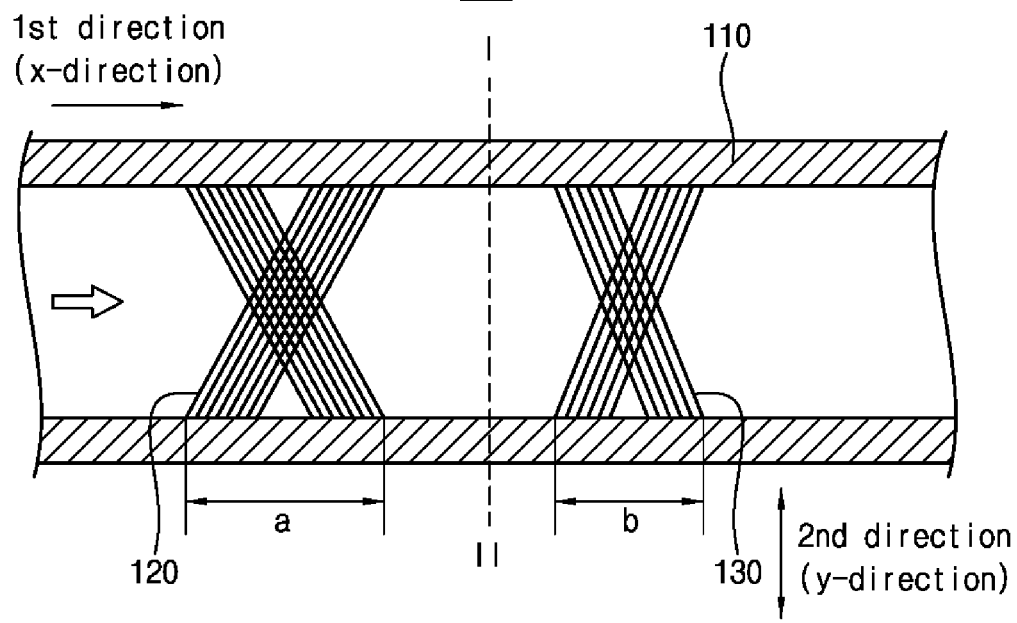
FIG. 1 is a cross-sectional view illustrating a droplet generating device in accordance with an example embodiment of the present invention.

Hereinafter, a droplet generating device and a droplet generating method in accordance with example embodiments of the present invention are described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the sizes and relative sizes of layers and areas may be exaggerated for clarity.

It will be understood that, although the terms first, second, etc. may be used herein to describe various elements, components, areas, layers and/or sections, these elements, components, areas, layers and/or sections should not be limited by these terms. These terms are only used to distinguish one element, component, area, layer or section from another area, layer or section. Thus, a first element discussed below could be termed a second element without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
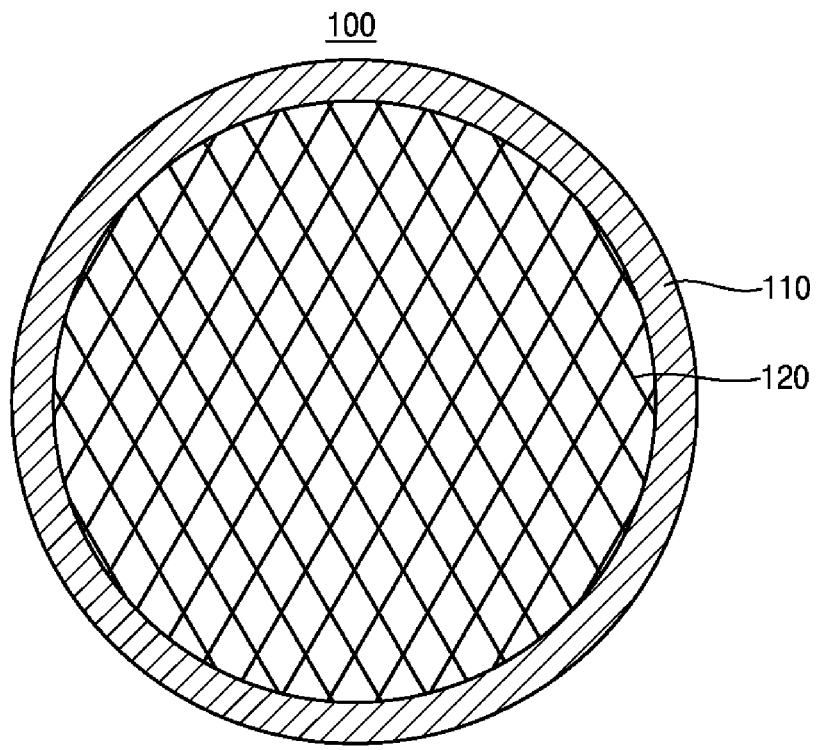
FIG. 2 is a side view of the droplet generating device in FIG. 1.
Figure 3:
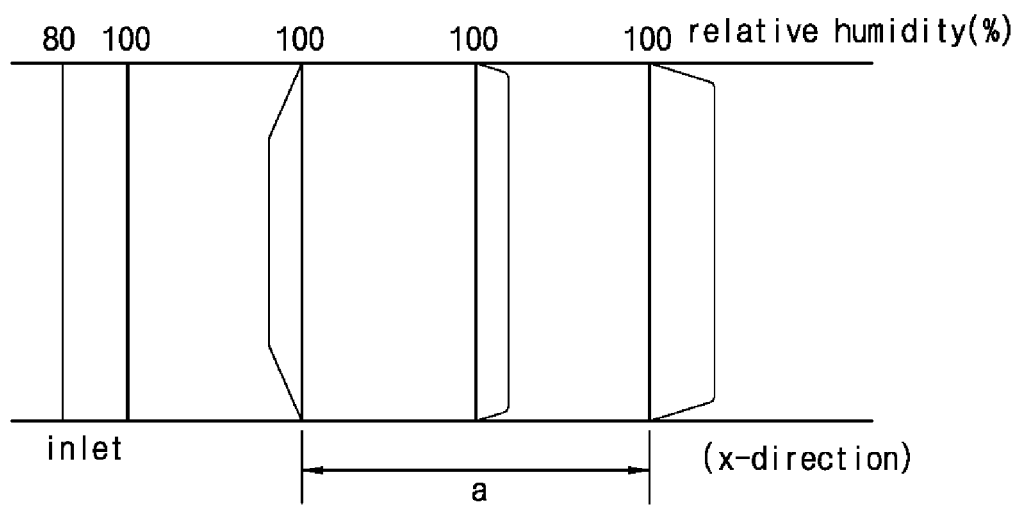
FIG. 3 is a graph showing a supersaturation degree along a second direction (Y-direction)
Figure 4:
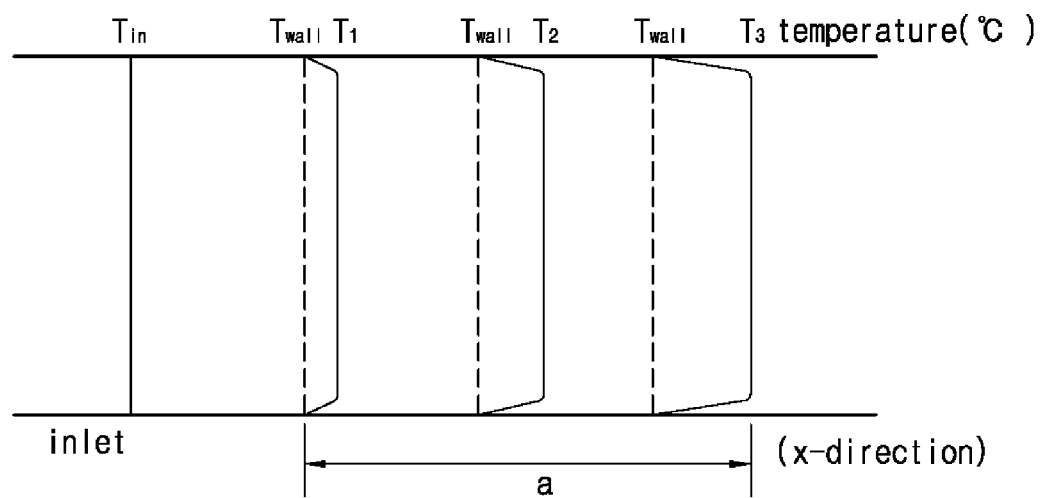
Figure 5:
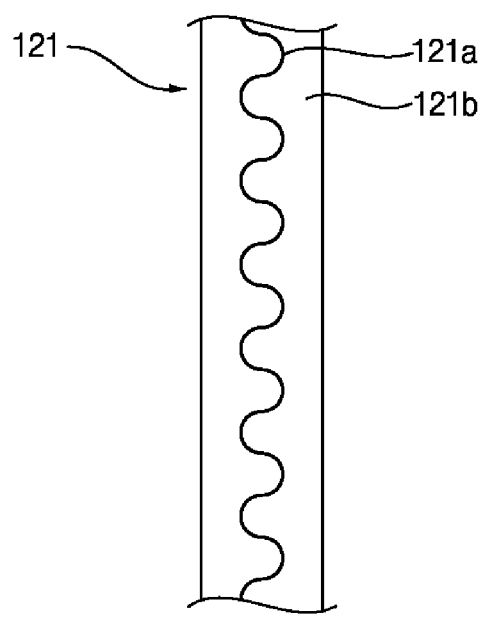
FIG. 5 is a cross-sectional view illustrating a wire included in a evaporation and condensation unit.

FIG. 1 is a cross-sectional view illustrating a droplet generating device in accordance with an example embodiment of the present invention. FIG. 2 is a side view of the droplet generating device in FIG. 1. FIG. 3 is a graph showing a supersaturation degree along a second direction (Y-direction).

Referring to FIGS. 1 to 3, a droplet generating device 100 in accordance with an example embodiment includes a tube 110 and an evaporation and condensation unit 120. The droplet generating device 100 may generate a droplet on surfaces of particles contained in air using condensation phenomena.

The air contains the particles. That is, the particles include fine dusts or ultrafine dusts each having a nano size. Alternatively, the particles include living organism containing viruses. The particles may be organic particles or inorganic particles.

The air has a first temperature, which is relatively low.

The tube 110 defines an area in which the air containing the particles flows along a first direction. That is, a direction along which the air flows is defined as the first direction (or an X-direction). Further, a direction perpendicular to the first direction is defined as a second direction (or a Y-direction).

The tube 110 may have a cylindrical shape having a hollow therein. Alternatively, the tube 110 may have a polygonal column shape having a hollow therein. That is, it is sufficient that the tube 110 has a hollow formed therein to provide the area, and a shape of the tube 110 is not limited thereto.

The tube 110 has an inlet through which the air flows into the hollow and an outlet through which the air flows outwardly from the hollow. That is, the tube 110 includes both the inlet and the outlet through which the air flows along the first direction.

The evaporation and condensation unit 120 is disposed in the tube 110. Further, the evaporation and condensation unit 120 is arranged to intersect with respect to the first direction. Therefore, the air which is flowing in the tube 110 in the first direction makes direct contact with the evaporation and condensation unit 120, such that the vapor provided from the evaporation and condensation unit 120 may be effectively condensed on surfaces of the particles.

In addition, the evaporation and condensation unit 120 can allow the air to meet the evaporation and condensation unit 120 to locally change a flow direction of the air. That is, the air flows as a whole along the first direction and flows locally in a direction differently from the first direction. As a result, the air flow is locally shaken within the area, and the air swirling time can be prolonged. In addition, turbulence such as vortices can occur. As a result, as the turbulence is locally formed, the swirling time of the particles contained in the air adjacent to the evaporation and condensation unit 120 can be increased. As a result, droplets containing the particles and the condensed liquid can be generated more effectively.

The evaporation and condensation unit 120 supplies vapor within the area to make the area through a saturated state into a supersaturated state. In other words, the evaporation and condensation unit 120 vaporizes liquid that is being held and supplies the vapor in the area. Therefore, a supersaturated state can be formed in the area adjacent to the evaporation and condensation unit 120 disposed in the area.

That is, before the evaporation and condensation unit 120 is driven, the evaporation and condensation unit 120 holds the liquid but does not generate steam. On the other hand, when the evaporation and condensation unit 120 is driven, the evaporation and condensation unit 120 holding the liquid generates vapor to supply the vapor within the area. Thus, the vapor is supplied into the area such that the area is converted into the supersaturated state.

Further, the air which is flowing in the area adjacent to the evaporation and condensation unit 120 meets the vapor in a supersaturated state, and the vapor condenses on the surfaces of the particles. Therefore, a droplet having vapor condensed on the surfaces of the particles is generated.

According to an embodiment of the present invention, the evaporation and condensation unit 120 is arranged in the tube 110 instead of the evaporation and condensation unit being arranged along an inner wall of the tube, the air makes effectively contact with the evaporation and condensing unit 120 along a flowing direction of the air. Thus, the vapor provided from the evaporation and condensation unit 120 can be efficiently condensed on the surfaces of the particles included in the air, such that the droplet generation efficiency can be improved.

In the example of an example embodiment of this invention, the evaporation and condensation unit 120 can be inclined with a slope angle of 5 to 90 degrees with respect to the first direction.

If the evaporation and condensate unit 120 is arranged parallel to a central axis extending in the first direction within the tube 110 (comparative Example 1), a degree of supersaturation in the area may be different depending on a distance from the evaporation and condensation unit 110. For example, a relative humidity becomes about 100% at a position where steam is supplied from the evaporation condensing unit, and a relative humidity increases as a position of the evaporating and condensing unit is distant away from the evaporation and condensing unit. Further, a relative humidity reversely decreases as the position approaches to the side innerwall away from the central axis of the tube. Thus, the tube has different degrees of supersaturation, depending on the position of the tube in the second direction.

When the evaporation and condensation unit is arranged parallel to the first direction while surrounding an outer circumferential surface of the tube (Comparative Example 2), the degree of supersaturation in the area may be different depending on the distance distant from the evaporation and condensation unit. For example, the relative humidity is about 100% at a vapor generating position where vapor is generated adjacent to the evaporation and condensing unit, and the relative humidity increases as it approached to the central area of the tube along the second direction. In addition, the relative humidity may be partially reduced as an air-stagnant time is drastically reduced in a central area of the tube. Therefore, the degree of supersaturation varies depending on the position of the tube in the second direction.

When the evaporation and condensation unit 120 according to an embodiment of the present invention is inclined in the tube 110 at an angle of 5 to 90 degrees with respect to the first direction, the evaporation and condensation unit 120 may supply the steam into the area at all of positions at which the evaporation and condensation unit 120 is installed. The degree of supersaturation can be uniformed entirely along an arrangement direction in which the evaporation and condensation unit 120 is arranged.

Referring to FIG. 3, when the evaporation and condensation unit 120 is inclined at 90 degrees along the first direction, the area in the tube has a uniform degree of supersaturation along the second direction perpendicular to the first direction in the tube 110. Thus, the vapor can be condensed on the surfaces of the particles contained in the air, and the droplet can be uniformly formed as a whole.

For example, when the air supplied to the inlet has a relative humidity of about 80%, the relative humidity can be increased as a position is away from the inlet along the X-direction and the area changes to a supersaturated state as the air passes through the area where the evaporation and condensation unit 120 is provided. It can be confirmed that a uniform degree of supersaturation can be obtained along the second direction.

In an example embodiment of the present invention, the evaporation and condensation unit 120 may be arranged entirely in the second direction, a vertically cross-section of the area perpendicular to the first direction. Thus, the evaporation and condensation unit 120 is entirely in contact with the air which is flowing in the first direction. Therefore, the vapor supplied from the evaporation and condensation unit 120 can be effectively condensed on the surfaces of the particles contained in the air.

FIG. 4 is a graph showing a temperature distribution along a second direction (Y-direction).

Referring to FIG. 4, a temperature of the air flowing into the inlet has an initial temperature $T_{in}$, and the inner wall of the tube has a wall temperature $T_{wall}$. As the air passes through the evaporation and condensation unit 120, the temperature increases. In this case, the air may have a uniform temperature distribution along the second direction (y direction). Therefore, the vapor can be uniformly condensed at the surfaces of the particles included in the air along the second direction.

FIG. 5 is a cross-sectional view illustrating a wire included in an evaporation and condensation unit.

Referring to FIG. 5, the evaporation and condensation unit 120 may include at least one mesh structure 120 which includes a plurality of wires 121 randomly arranged. Reference numeral 120 denotes both an evaporation and condensation unit and a mesh structure.

That is, vapor may be supplied from each of the wires 121 to convert the area into a supersaturated state. In addition, since each of the wires 121 includes a heating element, the liquid retained in the wires can be effectively vaporized.

A through hole may be formed between the wires 121. Crossing points may be formed at specific points of intersection of the wires. Alternatively, the wires may be arranged on mutually different planes such that they do not cross. At this time, the through hole may be formed between the wires.

On the other hand, a flow path through which the air can flow can be provided through the through hole. As a result, the flow of air flowing in the first direction can be made uniform as a whole.

In an embodiment of the present invention, each of the wires 121 may include a heating body 121*a* for heating the liquid adjacent thereto. In addition, each of the wires 121 may further include a liquid-absorbing layer 121*b*. The liquid-absorbing layer 121*b* may be made of a hydrophilic material that holds the liquid as a source of the vapor. Examples of the material constituting the liquid-absorbing layer 121*b* include cellulose, titanium oxide, and the like.

That is, since each of the wires 121 may perform both a heat generating function and a steam supplying function, a wholly uniform supersaturation degree can be maintained along the direction in which the evaporation and condensation unit 120 is arranged.

In other words, after the heating element 121*a* generates heat, the heat is conducted toward the liquid-absorbing layer 121*b*. The liquid held in the liquid-absorption layer 121*b* can be heated and vaporized. Accordingly, uniform supersaturation degree may be maintained as a whole along the direction in which the evaporation and condensing unit 120 including the wires 121 are arranged.

Thus, in the area having the supersaturated state, vapor is condensed on the particles contained in the air flowing adjacent to the evaporation and condensation unit 120, such that a droplet containing the particles can be formed.

In addition, a uniform temperature distribution may be realized along the second direction perpendicular to the first direction at a specific point along the first direction. That is, when the evaporation and condensation unit 120 including the wires 121 is arranged along the second direction, a uniform temperature distribution may be achieved along the second direction due to the heat generated from the evaporation and condensation unit 120.

Each of the wires 121 may includes a concavo-convex pattern on the surface or a coating layer having a hydrophilic surface so as to receive a liquid using a capillary force. As a result, the wires 121 can hold the liquid lifted by the capillary force from a liquid reservoir (not shown) located below.

In an example embodiment of the present invention, the liquid is vaporized by the heat supplied from the heating element 121a at the surfaces of the wires 121. Thus, an distance from a steam generation point where steam is generated from the wires 121 to the particles included in the air and be adjacent to the wire 121 becomes relatively small. Therefore, the vapor generated from the wires 121 can more easily reach to the particles contained in the air, such that the vapor can be easily condensed on the surfaces of the particles.

Figure 6:
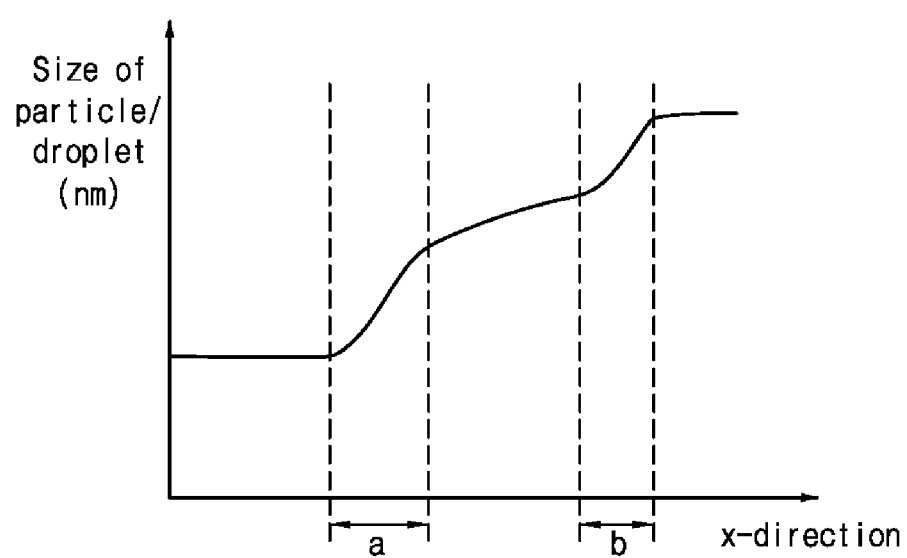
FIG. 6 is a graph illustrating sizes of particles and droplets along a first direction (X-direction)

FIG. 6 is a graph illustrating sizes of particles and droplets along a first direction (X-direction).

Referring to FIG. 6, an additional evaporation and condensation unit 130 (see FIG. 1) may be arranged in the tube 110 with being spaced from the evaporation and condensation unit 120. In this case, a plurality of evaporation and condensation units 120 and 130 may be arranged to be spaced apart from each other. Accordingly, since the plurality of evaporation and condensation units 120 and 130 are provided, a size of the droplet to be formed in the tube can be increased.

FIG. 7 is a flow chart illustrating a droplet generating method in accordance with an example embodiment of the present invention.

Referring to FIGS. 1, 3, and 7, according to a droplet generating method in 10 accordance with an example embodiment of the present invention, first air containing particles is supplied along a first direction in a tube in which an area is defined (110). A vapor is then supplied to the area to maintain a generally uniform supersaturation degree along a second direction perpendicular to the first direction within the area, thereby condensing the vapor on the surfaces of the particles to produce droplets.

In order to maintain the uniform supersaturation degree, an evaporation and condensation unit which is arranged to intersect the first direction in the tube may be used.

In an example embodiment of the present invention, the uniform supersaturation degree is maintained, and an entirely uniform temperature distribution may be formed along the second direction perpendicular to the first direction at a specific point along the first direction.

The droplet generating device and the droplet generating method according to example embodiments of the present invention can efficiently generate droplets by supplying vapor to the surfaces of particles having a relatively small size to condense the vapor on the surfaces of the particles. Thus, the present invention may be applied to apparatus that can measure or remove pollutants.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of the present invention.

What is claimed is:

1. A droplet generating device comprising:
   a tube defining an area in which air including particles flows along a first direction; and
   an evaporation and condensation unit disposed in the tube to intersect with the first direction, the evaporation and condensation unit supplying vapor in the area to supersaturate the area to condense the vapor on surfaces of the particles to form a droplet,
   wherein the evaporation and condensation unit has at least one mesh structure including a plurality of wires randomly arranged, and each of the wires includes a heating element being provided inside thereof and being configured to heat liquid formed on surfaces thereof and a liquid-absorbing layer having an intrinsically hydrophilic material to be capable of holding the liquid as a source of the vapor.

2. The droplet generating device of claim 1, wherein the evaporation and condensation unit is arranged to be inclined at 5 to 90 degrees with respect to the first direction.

3. The droplet generating device of claim 1, wherein the evaporation and condensation unit is arranged entirely over a vertical section of the area perpendicular to the first direction.

4. The droplet generating device of claim 1, wherein the mesh structure includes a through hole formed between the wires.

5. The droplet generating device of claim 1, wherein the heating element provides heat for the liquid to vaporize the liquid.

6. The droplet generating device of claim 1, wherein each of the wires includes a concave-convex pattern for holding liquid using a capillary force.

7. The droplet generating device of claim 1, wherein each of the wires includes a hydrophilic surface coating layer for holding liquid using a capillary force.

8. The droplet generating device of claim 1, wherein a plurality of mesh structures are spaced apart from each other along the first direction.

9. The droplet generating device of claim 1, wherein a supersaturation degree is uniformly formed as a whole along a second direction perpendicular to the first direction at a specific point along the first direction.

10. The droplet generating device of claim 1, wherein a temperature distribution is uniformly formed as a whole along a second direction perpendicular to the first direction at a specific point along the first direction.

11. A droplet generating method carried out in the droplet generating device of claim 1 comprising:
    providing air including particles in the tube defining the area along the first direction; and
    providing vapor in the area and maintaining a uniform supersaturation degree as a whole along a second direction perpendicular to the first direction to condense the vapor on surfaces of the particles.

12. The method of claim 11, wherein maintaining the uniform supersaturation degree is performed using the evaporation and condensation unit arranged in the tube to intersect with the first direction.

13. The method of claim 11, wherein maintaining the uniform supersaturation degree includes forming a temperature distribution uniformly as a whole along the second direction perpendicular to the first direction at a specific point along the first direction.

* * * * *